(12) United States Patent
Luo et al.

(10) Patent No.: US 12,095,093 B2
(45) Date of Patent: Sep. 17, 2024

(54) SILICON-BASED ANODE MATERIAL FOR LITHIUM-ION BATTERY, PREPARATION METHOD THEREFOR, AND BATTERY

(71) Applicant: TIANMULAKE EXCELLENT ANODE MATERIALS CO., LTD., Jiangsu (CN)

(72) Inventors: Fei Luo, Jiangsu (CN); Bonan Liu, Jiangsu (CN); Geng Chu, Jiangsu (CN); Hao Lu, Jiangsu (CN)

(73) Assignee: TIANMULAKE EXCELLENT ANODE MATERIALS CO., LTD., Jiangsu (CN)

( * ) Notice: Subject to any disclaimer, the term of this patent is extended or adjusted under 35 U.S.C. 154(b) by 871 days.

(21) Appl. No.: 17/250,688

(22) PCT Filed: Mar. 6, 2019

(86) PCT No.: PCT/CN2019/077119
§ 371 (c)(1),
(2) Date: Aug. 5, 2021

(87) PCT Pub. No.: WO2020/042577
PCT Pub. Date: Mar. 5, 2020

(65) Prior Publication Data
US 2022/0131154 A1    Apr. 28, 2022

(30) Foreign Application Priority Data

Aug. 27, 2018   (CN) .......................... 201810978803.2

(51) Int. Cl.
*H01M 4/00* (2006.01)
*B01J 21/06* (2006.01)
(Continued)

(52) U.S. Cl.
CPC ............. *H01M 4/625* (2013.01); *B01J 21/06* (2013.01); *B01J 23/72* (2013.01); *B01J 23/745* (2013.01);
(Continued)

(58) Field of Classification Search
CPC ...... H01M 4/364; H01M 4/386; H01M 4/366; H01M 2004/021; H01M 2004/027
See application file for complete search history.

(56) References Cited

U.S. PATENT DOCUMENTS

2014/0093761 A1   4/2014   Sakanaka et al.
2017/0110722 A1   4/2017   Lee et al.

FOREIGN PATENT DOCUMENTS

CN         1812168 A      8/2006
CN       101540390 A      9/2009
(Continued)

OTHER PUBLICATIONS

Iwaya et al., Electrode Slurry, Electrode, Manufacturing Method Thereof, and Secondary Battery, Jul. 2018, See the Abstract. (Year: 2018).*

(Continued)

*Primary Examiner* — Cynthia H Kelly
*Assistant Examiner* — Monique M Wills
(74) *Attorney, Agent, or Firm* — WELSH FLAXMAN & GITLER LLC

(57) ABSTRACT

The invention relates to a silicon-based anode material for a lithium-ion battery, a preparation method therefor, and a battery. The silicon-based negative electrode material is prepared by the compounding of 90 wt %-99.9 wt % of a silicon-based material and 0.1 wt %-10 wt % of carbon nanotubes and/or carbon nanofibers which grow on the surface of the silicon-based material in situ.

5 Claims, 12 Drawing Sheets

Select a silicon-based material according to a required mass ratio, and obtain a mixed material by supporting a catalyst on a surface of the silicon-based material by a solid phase method or a liquid phase method — 110

Place the mixed material in a high-temperature reaction furnace, heat the mixed material to 600°C-1200°C in a protective atmosphere, introduce a carbon source gas according to a required ratio, hold the temperature for 0.5-8 hours, and then stop introducing the carbon source gas and cool down to obtain the silicon-based anode material — 120

(51) Int. Cl.

| | | |
|---|---|---|
| *B01J 23/72* | (2006.01) | |
| *B01J 23/745* | (2006.01) | |
| *B01J 23/755* | (2006.01) | |
| *B01J 27/125* | (2006.01) | |
| *B01J 27/128* | (2006.01) | |
| *B01J 27/25* | (2006.01) | |
| *B01J 35/40* | (2024.01) | |
| *B01J 37/02* | (2006.01) | |
| *B01J 37/08* | (2006.01) | |
| *C01B 32/159* | (2017.01) | |
| *C01B 32/162* | (2017.01) | |
| *H01M 4/36* | (2006.01) | |
| *H01M 4/38* | (2006.01) | |
| *H01M 4/48* | (2010.01) | |
| *H01M 4/62* | (2006.01) | |
| *H01M 10/0525* | (2010.01) | |
| *H01M 4/02* | (2006.01) | |

(52) U.S. Cl.
CPC .......... *B01J 23/755* (2013.01); *B01J 27/125* (2013.01); *B01J 27/128* (2013.01); *B01J 27/25* (2013.01); *B01J 35/40* (2024.01); *B01J 37/0236* (2013.01); *B01J 37/08* (2013.01); *C01B 32/159* (2017.08); *C01B 32/162* (2017.08); *H01M 4/364* (2013.01); *H01M 4/386* (2013.01); *H01M 4/483* (2013.01); *H01M 10/0525* (2013.01); *C01B 2202/02* (2013.01); *C01B 2202/06* (2013.01); *C01B 2202/22* (2013.01); *C01B 2202/34* (2013.01); *C01B 2202/36* (2013.01); *C01P 2002/72* (2013.01); *C01P 2002/82* (2013.01); *H01M 2004/021* (2013.01); *H01M 2004/027* (2013.01)

(56) References Cited

FOREIGN PATENT DOCUMENTS

| | | | |
|---|---|---|---|
| CN | 102185128 A | | 9/2011 |
| CN | 106876665 A | * | 6/2017 |
| CN | 108023072 A | | 5/2018 |
| CN | 108183201 A | | 6/2018 |
| JP | 2006244984 A | | 9/2006 |
| JP | 2008027912 A | | 2/2008 |
| JP | 2010095797 A | | 4/2010 |
| JP | 2017076597 A | | 4/2017 |
| KR | 2007-0088534 A | | 8/2007 |
| WO | WO-2018135352 A1 | * | 7/2018 .......... H01M 10/052 |

OTHER PUBLICATIONS

Li et al., Silicon-carbon Composite Particles, Preparation Method and Application Thereof, Jun. 2017, See the Abstract. (Year: 2017).*
Chinese First Office Action in priority application No. 201810978803. 2; Office Action Date Aug. 2, 2021; Machine Translation Provided.
Japan Office Action in corresponding application No. 2021-510930; Office Action Date Sep. 20, 2022; Machine Translation Provided.
Korean Office Action with Machine translation.
Nanoscale engineered electrochemically active silicon_CNT heterostructures-novel anodes for LI-ion application Aug. 24, 2012.
Japan Patent Office, Office Action, Issued Jan. 25, 2020.
European Patent Office, Extended European Search Report, Issued May 9, 2022.

* cited by examiner

Select a silicon-based material according to a required mass ratio, and obtain a mixed material by supporting a catalyst on a surface of the silicon-based material by a solid phase method or a liquid phase method    110

Place the mixed material in a high-temperature reaction furnace, heat the mixed material to 600°C-1200°C in a protective atmosphere, introduce a carbon source gas according to a required ratio, hold the temperature for 0.5-8 hours, and then stop introducing the carbon source gas and cool down to obtain the silicon-based anode material    120

FIG. 1

SILICON-BASED ANODE MATERIAL FOR LITHIUM-ION BATTERY, PREPARATION METHOD THEREFOR, AND BATTERY

The present disclosure claims the priority to a Chinese Patent Disclosure No. 201810978803.2, entitled "Silicon-based Anode Material for Lithium-ion Battery, Preparation Method Therefor, and Battery," filed in the China National Intellectual Property Administration on Aug. 27, 2018, as well as PCT Application No. PCT/CN2019/077119 filed Mar. 6, 2019.

BACKGROUND OF THE INVENTION

Technical Field

The disclosure relates to the technical field of lithium battery materials, and in particular to a silicon-based anode material for a lithium-ion battery, a preparation method therefor, and a battery.

Description of Related Art

Since its first appearance in the 1990s, lithium-ion batteries have gradually occupied the portable consumer electronics market represented by mobile phones and computers. They also have broad disclosure prospects in the field of large-scale energy storage and electric vehicles. Lithium-ion battery anode materials have gradually evolved from coke-based materials to today's natural graphite, artificial graphite, etc. The technology of carbon-based anodes has been very mature. However, the theoretical specific capacity of 372 mAh/g can no longer meet people's increasing requirements for energy density, and the development of new anode materials has become a top priority.

Silicon-based anode materials with higher capacity are expected to be used in the next generation of high-energy-density lithium-ion batteries. It has basically become the consensus of the industry, but the problems of volume expansion and unstable interface reactions during the cycle have not been completely resolved. At present, the development directions of silicon-based anode materials include nano silicon-carbon composite materials, Silicon monoxide materials, modified Silicon monoxide materials, amorphous silicon alloys, etc. In all development directions, carbon coating is a necessary process step. The continuous carbon film formed on the surface of the material can improve the conductivity of the silicon-based material and inhibit the side reaction between the material and the electrolyte.

However, it has been reported in the Reference (Effect of Volume Expansion on SEI Covering Carbon-Coated Nano-Si/SiO Composite Journal of The Electrochemical Society, 160 (10)) that the carbon film formed by ordinary coating will crack obviously during the charge and discharge cycle, resulting in the failure of the electrochemical contact of the material and the rapid decay of the cycle.

Therefore, it is a technical problem in the field of lithium-ion batteries to develop a silicon-based anode material with stable cycling and good conductivity.

BRIEF SUMMARY OF THE INVENTION

In view of the shortcomings of the prior art, the objective of the disclosure is to provide a silicon-based anode material for a lithium-ion battery, a preparation method therefor, and a battery. The silicon-based anode material has the characteristics of stable structure, good rate performance, and excellent cycle performance.

In a first aspect, the embodiments of the disclosure provide a silicon-based anode material for a lithium-ion battery, composed of 90 wt %-99.9 wt % of a silicon-based material and 0.1 wt %-10 wt % of carbon nanotubes and/or carbon nanofibers grown in situ on the surface of the silicon-based material;

The silicon-based material is a powder material containing electrochemically active silicon and includes one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material;

The carbon nanotubes include single-walled carbon nanotubes and/or multi-walled carbon nanotubes; the carbon nanotubes and/or carbon nanofibers have a diameter of 0.4-50 nm and a length of 10 nm-50 μm;

The Raman spectrum of the silicon-based anode material for the lithium-ion battery has an amorphous bulge at $475\pm10$ cm$^{-1}$ and/or a crystalline peak at $510\pm10$ cm$^{-1}$; in the case where the silicon-based anode material for the lithium-ion battery include single-walled carbon nanotubes, the Raman spectrum of the silicon-based anode material for a lithium-ion battery has a radial breathing mode (RBM) in the range of 100 cm$^{-1}$ to 400 cm$^{-1}$;

The X-ray diffraction (XRD) pattern of the silicon-based anode material for the lithium-ion battery has a diffraction peak at $28.4°\pm0.2°$.

Preferably, the single-wall carbon nanotubes have a diameter of 0.4 nm-10 nm and a length of 10 nm-20 μm;

The multi-walled carbon nanotubes have a diameter of 0.4 nm-50 nm and a length of 10 nm-20 μm;

The carbon nanofibers have a diameter of 0.4 nm-50 nm and a length of 10 nm-20 μm.

Preferably, an average particle size of the silicon-based anode material for the lithium-ion battery is between 50 nm and 40 μm.

Further preferably, the average particle size of the silicon-based anode material for a lithium-ion battery is between 1 μm and 20 μm.

In a second aspect, the embodiments of the present disclosure provide a preparation method of the silicon-based anode material for the lithium-ion battery according to the first aspect, including:

selecting a silicon-based material according to a required mass ratio, and obtain a mixed material by supporting a catalyst on a surface of the silicon-based material by a solid phase method or a liquid phase method, wherein the silicon-based material is a powder material containing electrochemically active silicon and includes one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material; the catalyst includes one or mixture of more of an elemental metal, an inorganic compound containing the elemental metal, and an organic compound containing the elemental metal; the elemental metal includes one or mixture of more of Fe, Co, Ni, Cu, Zn, Al, Mg, Li, Au, Ag, Ru, and Pt; and placing the mixed material in a high-temperature reaction furnace, heating the mixed material to 600° C.-1200° C. in a protective atmosphere, introducing a carbon source gas according to a required ratio, and holding the temperature for 0.5-8 hours, and then stopping introducing the carbon source gas and cooling down to obtain the silicon-based anode material; wherein the carbon source gas includes one or mixture of more of alkynes, alkenes, alkanes, ketones, alcohols, and aromatic gases.

Preferably, the solid phase method specifically includes: thoroughly mixing the silicon-based material with the catalyst through a mixer, a ball mill, or a fusion machine;

The liquid phase method specifically includes: thoroughly mixing the silicon-based material with a solution containing the catalyst and then drying; wherein the solution includes one or mixture of more of water, alcohols, ketones, and amides.

Further preferably, the mass ratio of the silicon-based material to the catalyst is between 90:10 and 99.9999:0.0001.

Preferably, the protective atmosphere is one or mixture of more of nitrogen, argon, hydrogen, helium, and neon;

A volume ratio of the protective atmosphere to the carbon source gas is between 0.1:9.9 and 9.9:0.1.

In a third aspect, the embodiments of the present disclosure provide an anode piece comprising the silicon-based anode material for the lithium-ion battery.

In a fourth aspect, the embodiments of the present disclosure provide a lithium battery using the silicon-based anode material for the lithium-ion battery.

According to the silicon-based anode material for a lithium-ion battery of the disclosure, since the silicon-based material containing electrochemically active silicon is coated with carbon nanotubes or carbon nanofibers grown in situ, the anode material has stable structural performance and the cycle performance of the material can be greatly improved. The preparation method of the silicon-based anode material is simple and highly efficient, and is beneficial to mass production. The lithium-ion battery using the material as the anode piece has benefits of high energy density, high cycle performance, and high-rate performance.

BRIEF DESCRIPTION OF THE INVENTION

The technical solutions of the embodiments of the disclosure will be further described in detail below in conjunction with the accompanying drawings and embodiments;

FIG. 1 is a flowchart of a preparation method of a silicon-based anode material for a lithium-ion battery provided by an embodiment of the present disclosure;

DETAILED DESCRIPTION OF THE INVENTION

Figure 2:
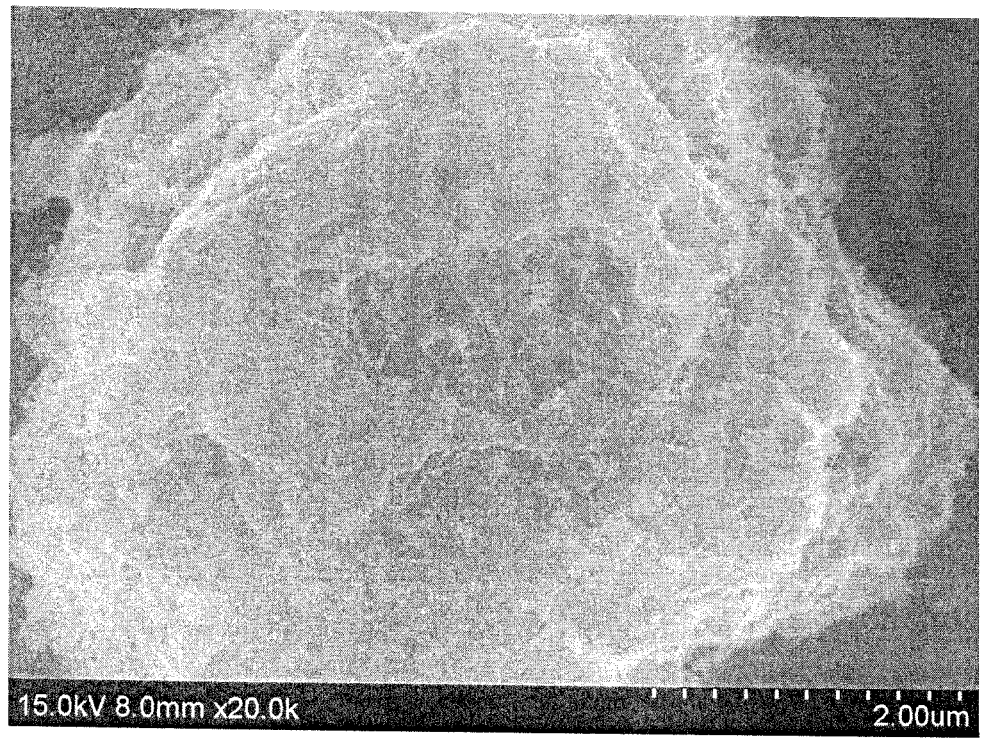
FIG. 2 is a scanning electron microscope (SEM) image of the silicon-based anode material for a lithium-ion battery obtained in Embodiment 1 of the disclosure.

The disclosure will be described below in further detail with reference to the embodiments, but the protection scope of the disclosure is not limited to the following description.

The embodiments of the disclosure provide a silicon-based anode material for a lithium-ion battery, composed of 90 wt %-99.9 wt % of a silicon-based material and 0.1 wt %-10 wt % of carbon nanotubes and/or carbon nanofibers grown in situ on the surface of the silicon-based material; the average particle size of the silicon-based anode material for a lithium-ion battery is between 50 nm and 40 μm, preferably between 1 μm and 20 μm.

The silicon-based material is a powder material containing electrochemically active silicon and includes one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material.

The carbon nanotubes and carbon nanofibers have a diameter of 0.4 nm-50 nm and a length of 10 nm-50 μm.

Wherein, the carbon nanotubes include single-walled carbon nanotubes and/or multi-walled carbon nanotubes; the single-wall carbon nanotubes have a preferred diameter of 0.4 nm-10 nm and a preferred length of 10 nm-20 μm; the multi-wall carbon nanotubes and carbon nanofibers have a preferred diameter of 0.4 nm-50 nm and a preferred length of 10 nm-20 μm.

In the Raman spectrum of the silicon-based anode material for a lithium-ion battery, an amorphous bulge is visible near 475 cm$^{-1}$ in the range of the typical value being 475±10 cm$^{-1}$, and/or a crystalline peak is visible near 510 cm$^{-1}$ in the range of the typical value being 510±10 cm$^{-1}$; in the case where the silicon-based anode material for a lithium-ion battery includes single-walled carbon nanotubes, the Raman spectrum of the silicon-based anode material for a lithium-ion battery has a Radial Breathing Mode (RBM) in the range of 100 cm$^{-1}$ to 400 cm$^{-1}$.

The X-ray diffraction (XRD) pattern of the silicon-based anode material for a lithium-ion battery has a diffraction peak near 28.4° in the range of the typical value being 28.4°±0.2°.

The embodiments of the disclosure provide a preparation method of the above-mentioned silicon-based anode material for a lithium-ion battery, which, as shown in the flowchart in FIG. 1, comprises the following steps:

Step 110: a silicon-based material is selected according to a required mass ratio, and a catalyst is supported on the surface of the silicon-based material by a solid phase method or a liquid phase method to obtain a mixed material;

Wherein, the silicon-based material is a powder material containing electrochemically active silicon and includes one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material.

The catalyst includes one or mixture of more of an elemental metal (such as Fe, Co, Ni, Cu, Zn, Al, Mg, Li, Au, Ag, Ru, and Pt), an inorganic compound containing the above-mentioned elemental metal, and an organic compound containing the above-mentioned elemental metal.

The solid phase method refers to thoroughly mix the silicon-based material with the catalyst in a high-speed VC machine, a cone mixer, a ball mill, a fusion machine or other equipment.

The liquid phase method refers to thoroughly mix the silicon-based material with a solution containing the catalyst and dry it; the solution includes one or mixture of more of water, alcohols, ketones, and amides.

In the above mixing, the mass ratio of the silicon-based material to the catalyst is between 90:10 and 99.9999:0.0001.

Step 120: the mixed material is placed in a high-temperature reaction furnace and heated to 600° C.-1200° C. in a protective atmosphere, a carbon source gas is introduced according to a required ratio, the temperature is held for 0.5-8 hours, and then the operation of introducing the carbon source gas is stopped and the reaction system is cooled down to obtain the silicon-based anode material;

Wherein, the carbon source gas includes one or mixture of more of alkynes such as acetylene, alkenes such as ethylene, alkanes such as methane, ketones such as acetone, alcohols such as ethanol, and aromatic gases such as toluene.

The protective atmosphere is one or mixture of more of nitrogen, argon, hydrogen, helium, and neon;

The volume ratio of the protective atmosphere to the carbon source gas is between 0.1:9.9 and 9.9:0.1.

According to the silicon-based anode material for a lithium-ion battery of the disclosure, since the silicon-based material containing electrochemically active silicon is coated with carbon nanotubes or carbon nanofibers grown in situ, the structure of carbon nanotubes or carbon nanofibers makes it possible that the silicon-based materials still connect to each other after the expansion and contraction of the silicon-based material, thereby ensuring the connection of the conductive network. The anode material has stable structural performance and can greatly improve the cycle performance of the material. The preparation method of the silicon-based anode material is simple and highly efficient, and is beneficial to mass production. The lithium-ion battery using the material as the anode piece has the benefits of high energy density, high cycle performance, and high-rate performance.

The silicon-based anode material for a lithium-ion battery and the preparation method thereof set forth in the disclosure are described above, and some specific embodiments are used to further describe them in detail.

Embodiment 1

This embodiment provides a specific preparation method of a silicon-based anode material for a lithium-ion battery, including:

First, thoroughly mixing commercial product of Silicon monoxide powder with an aqueous solution of ferric chloride, and spray drying to obtain the catalyst-supported Silicon monoxide powder; wherein the weight fraction of ferric chloride is 0.05%; and Second, placing the catalyst-supported Silicon monoxide powder in a high-temperature rotary furnace, heating the catalyst-supported Silicon monoxide powder to 900° C. under a mixed gas (Ar:$H_2$=1:0.1), introducing acetylene gas of which the volume is equivalent to that of hydrogen, holding the temperature for 4 hours, then stopping introducing acetylene gas, and cooling down to obtain the Silicon monoxide composite material with carbon nanotubes grown in situ.

The SEM experiment of the disclosure was performed on an S-4800 scanning electron microscope, and the same operation was applied to the following examples.

The SEM image of the Silicon monoxide composite material with carbon nanotubes grown in situ obtained in this embodiment is shown in FIG. 2. It can be seen that there are carbon nanotubes grown in situ on the surface of the material.

The XRD experiment of the disclosure was performed on a Bruke D8 Advance X-ray diffractometer where Cu-Kα radiation was used and the scanning 2 θ angle was in a range of 10° to 90°, and the same operation was applied to the following embodiments.

Figure 3:
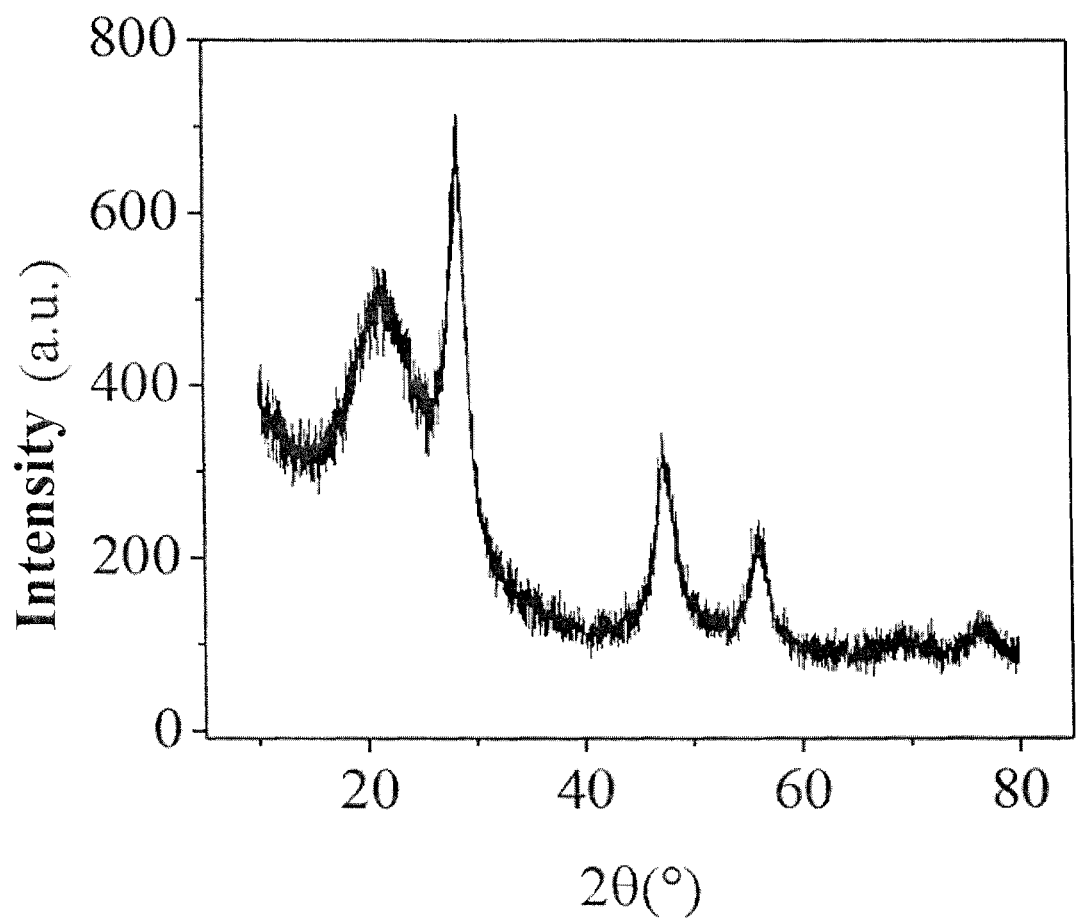
FIG. 3 is an X-ray diffraction (XRD) pattern of the silicon-based anode material for a lithium-ion battery obtained in Embodiment 1 of the disclosure.

The XRD pattern of the material obtained in this embodiment is shown in FIG. 3, and there is a characteristic peak of silicon at 28.5°.

The Raman experiment of the disclosure was performed on a ThermoFisher DXR laser Raman microscope within a collection range of 100 $cm^{-1}$ to 3000 $cm^{-1}$, and the same operation was applied to the following embodiments.

Figure 4:
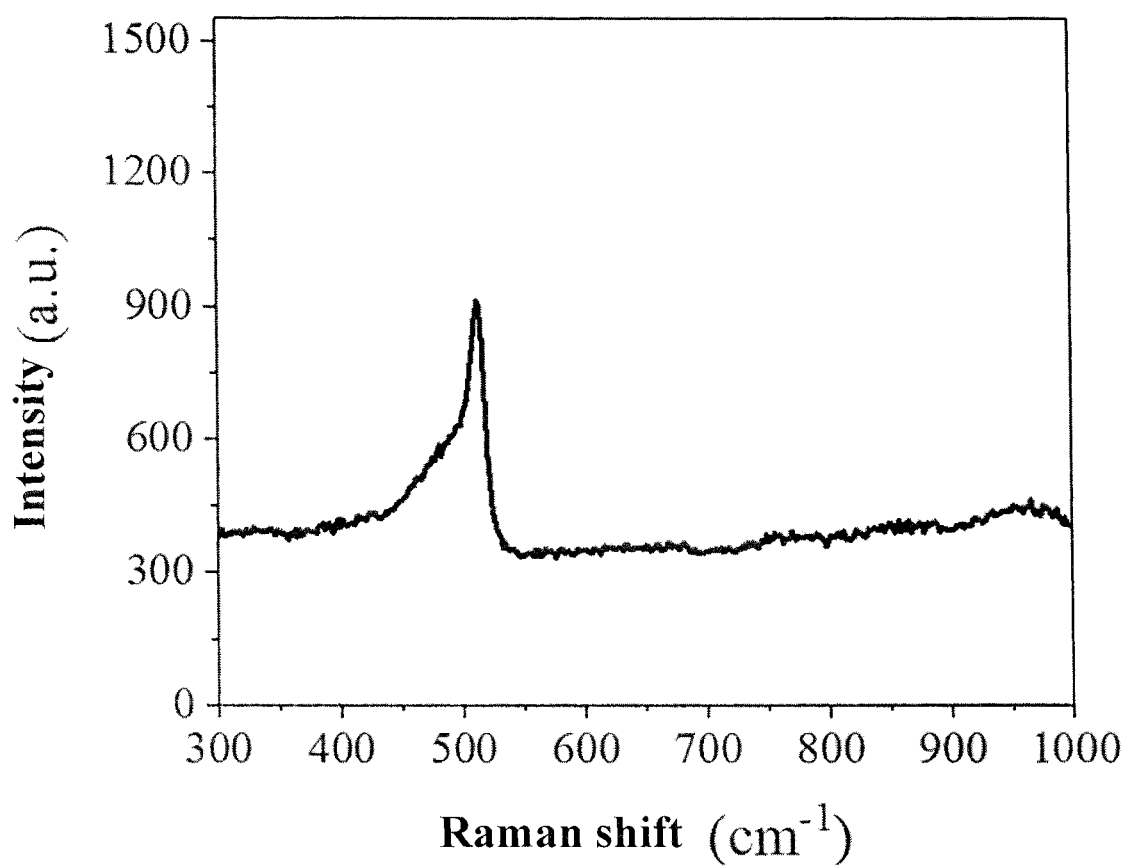
FIG. 4 is a partial enlarged view of a Raman spectrum of the silicon-based anode material for a lithium-ion battery obtained in Example 1 of the disclosure.
Figure 5:
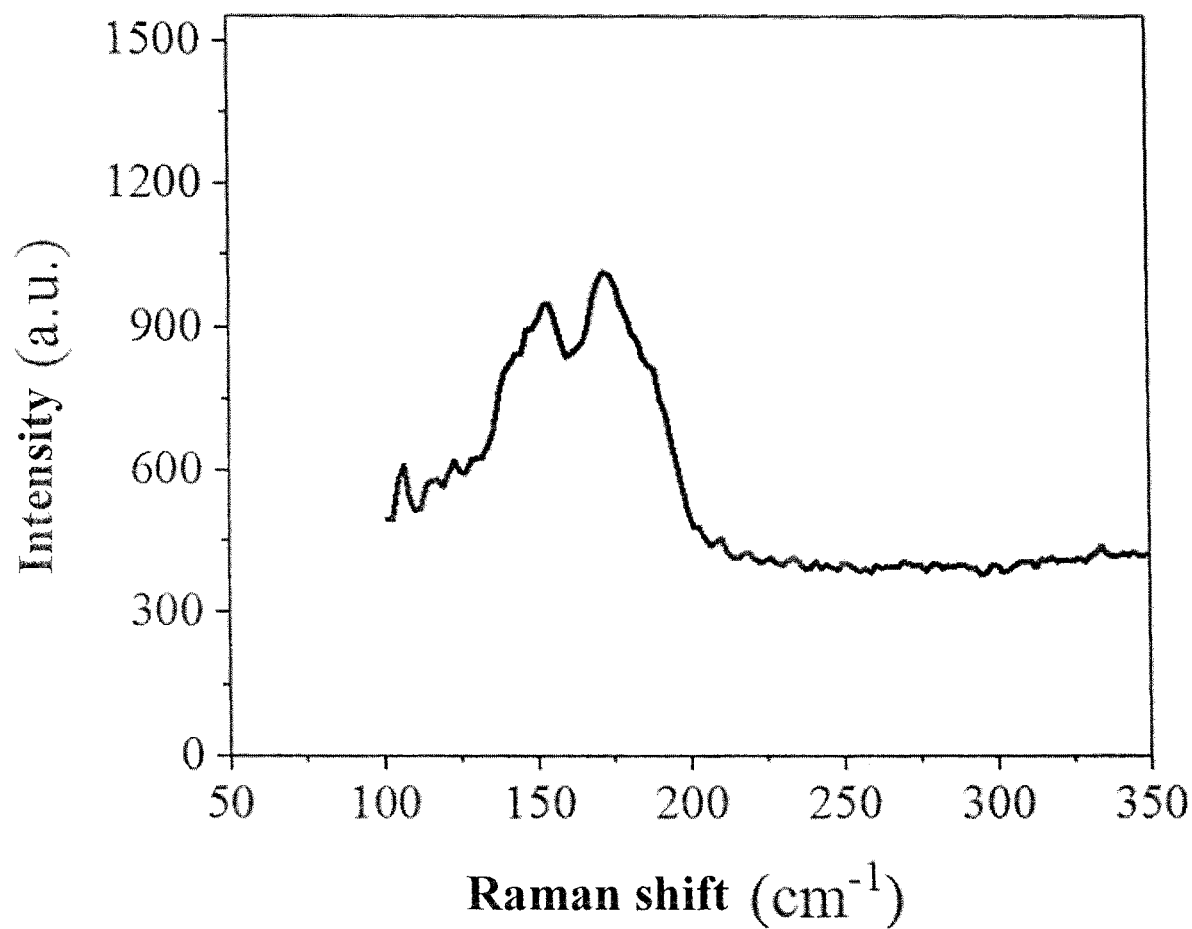
FIG. 5 is a partial enlarged view of a Raman spectrum of the silicon-based anode material for a lithium-ion battery obtained in Example 1 of the disclosure.

The Raman spectrum of the material obtained in this embodiment is shown in FIG. 4 and FIG. 5. It can be seen from FIG. 4 that there is a characteristic peak of silicon at 512 $cm^{-1}$; it can be seen from FIG. 5 that there are RBM peaks in the range of 100 $cm^{-1}$ to 400 $cm^{-1}$.

Figure 6:
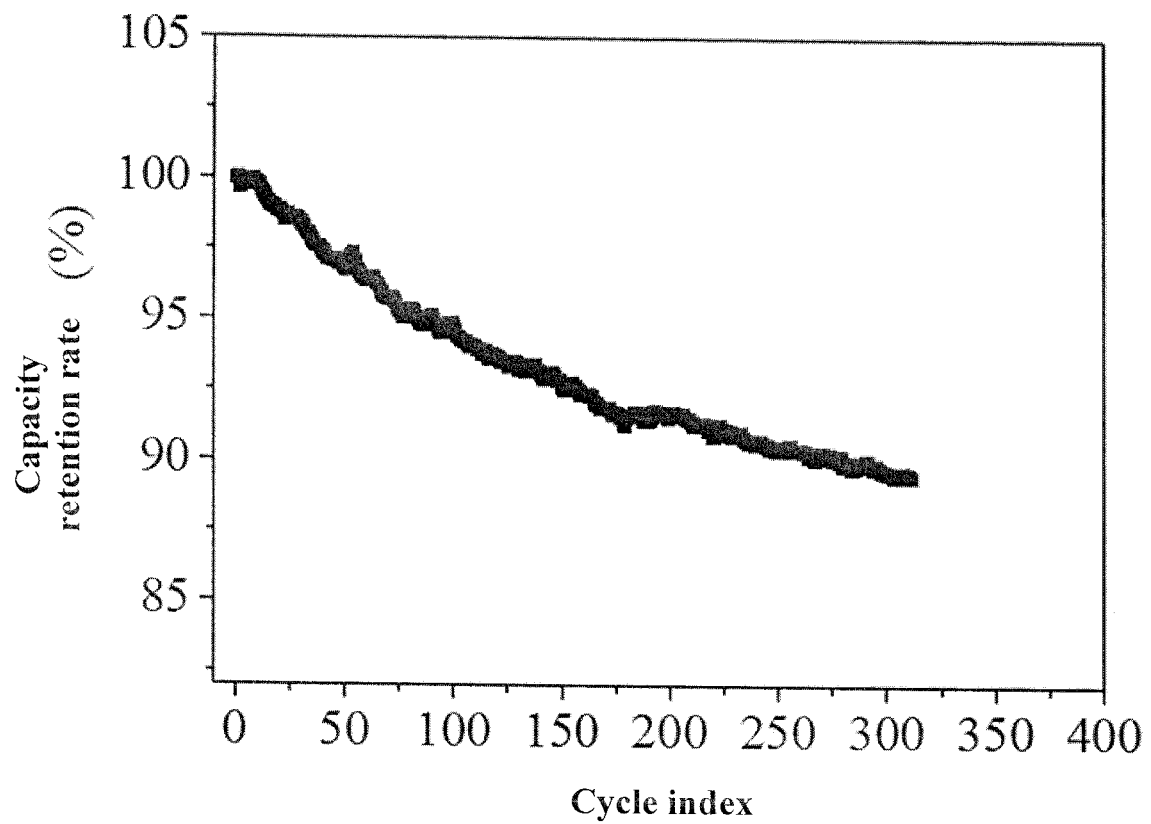
FIG. 6 is a cycle retention diagram of the silicon-based anode material for a lithium-ion battery obtained in Example 1 of the disclosure.

The Silicon monoxide composite material with carbon nanotubes grown in situ and commercial graphite were composited at a ratio of 1:9 to obtain a 450 mAh/g composite material, and the composite material was assembled with lithium cobaltate to form a full battery. In the cycle at 1C/1C, the cycle performance of the full battery was evaluated. As shown in FIG. 6, it can be seen that the material obtained in this sample has good cycle performance. Moreover, the data was recorded in Table 1 for easy comparison.

Embodiment 2

This embodiment provides a specific preparation method of a silicon-based anode material, including:

First, thoroughly mixing commercial product of Silicon monoxide powder with nano iron oxide in a high-speed VC machine, thus obtaining a catalyst-supported Silicon monoxide powder; wherein the weight fraction of nano iron oxide is 0.05%; and Second, placing the catalyst-supported Silicon monoxide powder in a high-temperature rotary furnace, heating the catalyst-supported Silicon monoxide powder to 900° C. under a mixed gas (Ar:$H_2$=1:0.1), introducing acetylene gas of which the volume is equivalent to that of hydrogen, holding the temperature for 4 hours, then stopping introducing acetylene gas, and cooling down to obtain the Silicon monoxide composite material with carbon nanotubes grown in situ.

Figure 7:
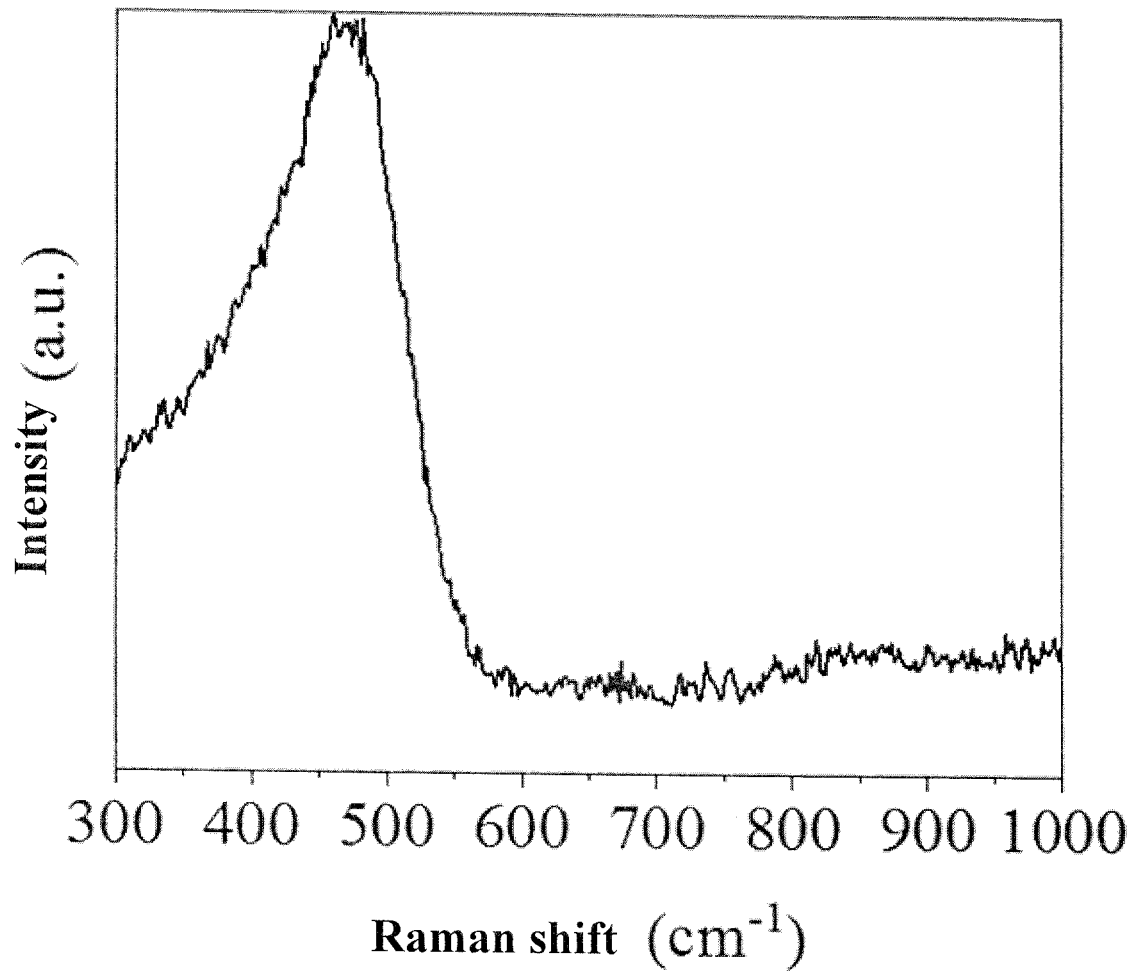
FIG. 7 is a partial enlarged view of a Raman spectrum of the silicon-based anode material for a lithium-ion battery obtained in Example 2 of the disclosure.
Figure 8:
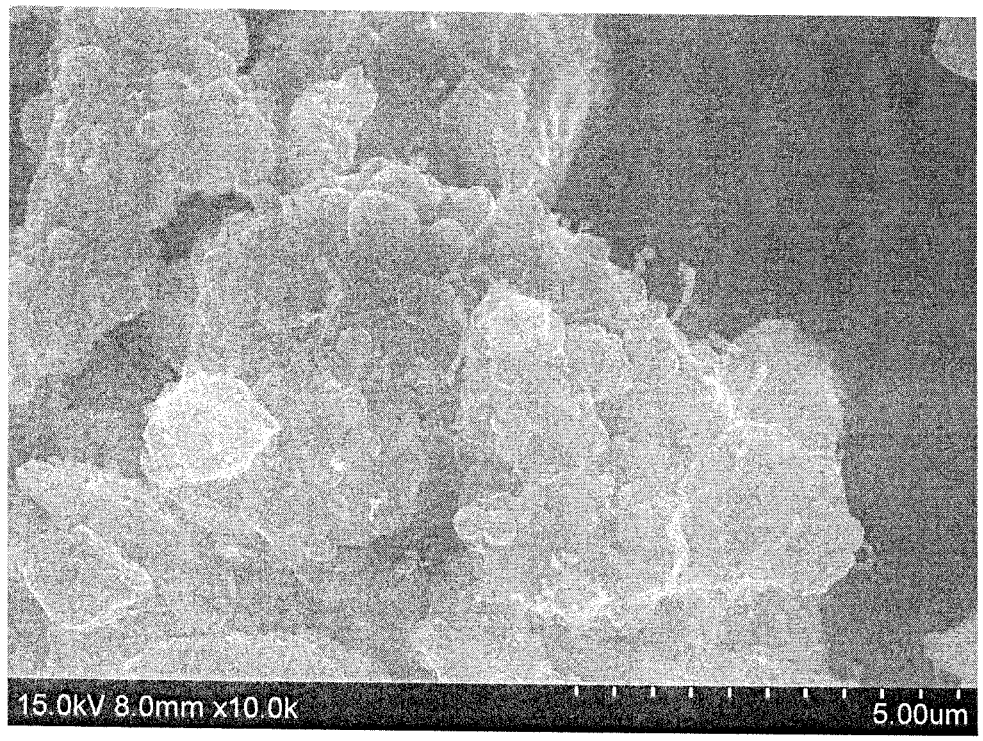
FIG. 8 is a scanning electron microscope (SEM) image of the silicon-based anode material for a lithium-ion battery obtained in Example 2 of the disclosure.

The Raman spectrum of the material obtained in this embodiment is shown in FIG. 7. It can be seen from FIG. 7 that there is a bulge of amorphous silicon at 475 $cm^{-1}$;

The SEM image of the Silicon monoxide composite material with carbon nanotubes grown in situ obtained in this example is shown in FIG. 8. It can be seen from that there are carbon nanotubes grown in situ on the surface of the material.

The material obtained in this example was mixed with graphite at the ratio to obtain a 450 mAh/g composite material. The electrochemical performance of the composite material was evaluated according to the method described in Example 1, and the data was recorded in Table 1.

Embodiment 3

This embodiment provides a specific preparation method of a silicon-based anode material, including:

First, thoroughly mixing commercial product of Silicon monoxide powder with nano metallic copper in a high-speed VC machine, thus obtaining a catalyst-supported Silicon monoxide powder; wherein the weight fraction of nano metallic copper is 0.05%; and Second, placing the catalyst-supported Silicon monoxide powder in a high-temperature rotary furnace, heating the catalyst-supported Silicon monoxide powder to 1000° C. under a mixed gas ($Ar:H_2=1:0.1$), introducing methane gas of which the volume is equivalent to that of hydrogen, holding the temperature for 4 hours, then stopping introducing methane gas, and cooling down to obtain the Silicon monoxide composite material with carbon nanotubes grown in situ.

Figure 9:
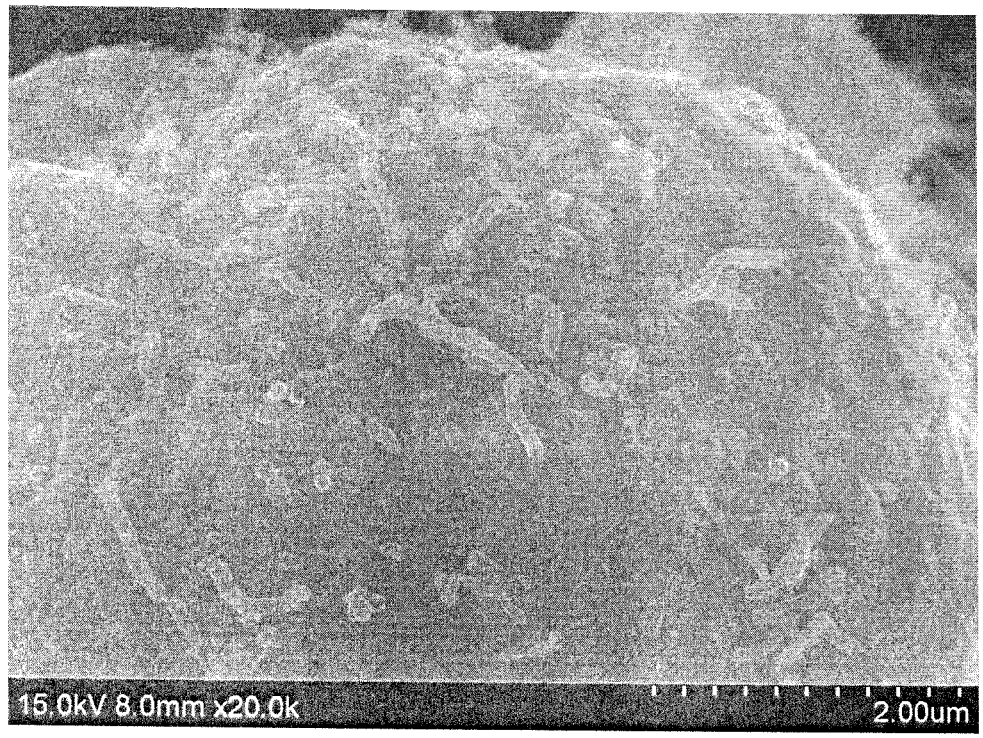
FIG. 9 is a scanning electron microscope (SEM) image of the silicon-based anode material for a lithium-ion battery obtained in Example 3 of the disclosure.

The SEM image of the Silicon monoxide composite material with carbon nanotubes grown in situ obtained in this example is shown in FIG. 9. It can be seen from that there are carbon nanotubes grown in situ on the surface of the material.

The material obtained in this embodiment was mixed with graphite at the ratio to obtain a 450 mAh/g composite material; the electrochemical performance of the composite material was evaluated according to the method described in Example 1, and the data was recorded in Table 1.

Embodiment 4

This embodiment provides a specific preparation method of a silicon-based anode material, including:

First, thoroughly mixing commercial product of nano silicon-carbon material powder with an aqueous solution of nickel nitrate, and spray drying to obtain the catalyst-supported nano silicon-carbon material powder; wherein the weight fraction of nickel nitrate is 0.05%; and Second, placing the catalyst-supported nano silicon-carbon material powder in a high-temperature rotary furnace, heating the catalyst-supported nano silicon-carbon material powder to 800° C. under the atmosphere of Ar, introducing acetylene gas of which the volume is equivalent to that of Ar, holding the temperature for 4 hours, then stopping introducing acetylene gas, and cooling down to obtain the nano silicon-carbon composite material with carbon nanotubes grown in situ.

Figure 10:
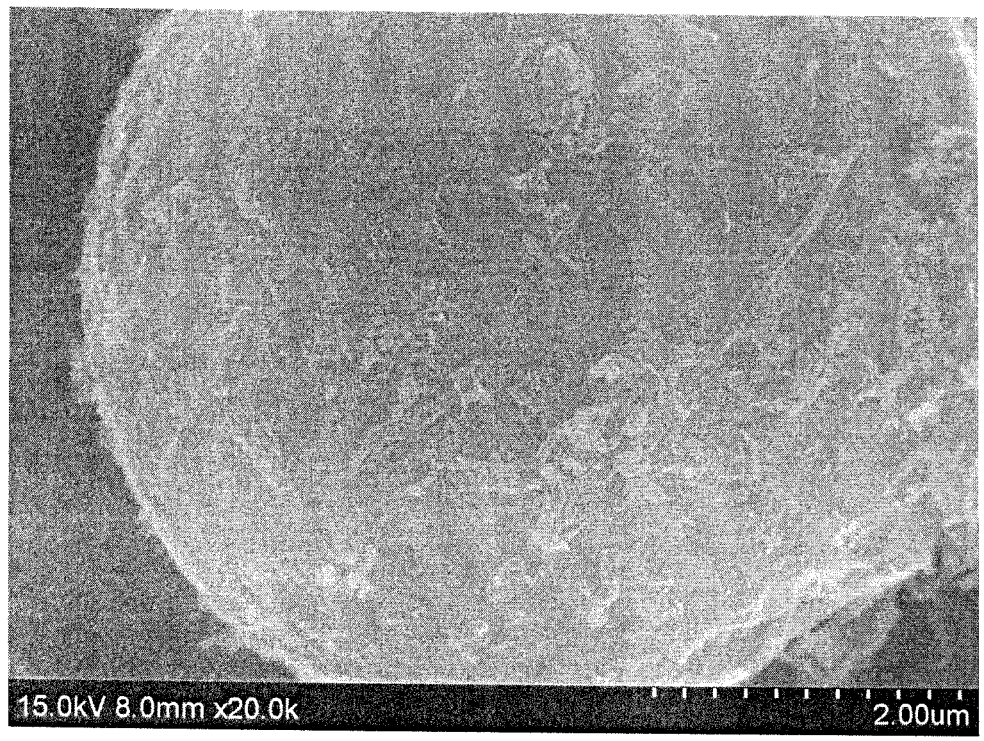
FIG. 10 is a scanning electron microscope (SEM) image of the silicon-based anode material for a lithium-ion battery obtained in Example 4 of the disclosure.

The SEM image of the nano silicon-carbon composite material with carbon nanotubes grown in situ obtained in this embodiment is shown in FIG. 10. It can be seen from that there are carbon nanotubes grown in situ on the surface of the material.

The nano silicon-carbon composite material with carbon nanotubes grown in situ obtained in this embodiment was mixed with graphite at the ratio to obtain a 450 mAh/g composite material; the electrochemical performance of the composite material was evaluated according to the method described in Example 1, and the data was recorded in Table 1.

Embodiment 5

This embodiment provides a specific preparation method of a silicon-based anode material, including:

First, thoroughly mixing commercial product of nano silicon-carbon material powder with nano nickel oxide in a high-speed VC machine, thus obtaining a catalyst-supported nano silicon-carbon material powder; wherein the weight fraction of nano nickel oxide is 0.1%; and Second, placing the catalyst-supported nano silicon-carbon material powder in a high-temperature rotary furnace, heating the catalyst-supported nano silicon-carbon material powder to 900° C. under a mixed gas ($Ar:H_2=1:0.1$), introducing ethanol vapor of which the volume is equivalent to that of hydrogen, holding the temperature for 2 hours, and then stopping introducing ethanol vapor, and cooling down to obtain the nano silicon-carbon composite material with carbon nanotubes grown in situ.

The nano silicon-carbon composite material with carbon nanotubes grown in situ obtained in this embodiment was mixed with graphite at the ratio to obtain a 450 mAh/g composite material; the electrochemical performance of the composite material was evaluated according to the method described in embodiment 1, and the data was recorded in Table 1.

Example 6

This embodiment provides a specific preparation method of a silicon-based anode material, including:

First, thoroughly mixing commercial product of nano silicon-carbon material powder with a mixed alcohol solution of ferric chloride and aluminum chloride in a high-speed VC machine, thus obtaining a catalyst-supported nano silicon-carbon material powder; wherein the weight fraction of nano nickel oxide is 0.1%; and Second, placing the catalyst-supported nano silicon-carbon material powder in a high-temperature rotary furnace, heating the catalyst-supported nano silicon-carbon material powder to 900° C. under a mixed gas ($Ar:H_2=1:0.1$), introducing ethanol vapor equivalent volume to that of hydrogen, holding the temperature for 2 hours, then stopping introducing ethanol vapor, and cooling down to obtain the nano silicon-carbon composite material with carbon nanotubes grown in situ.

The nano silicon-carbon composite material with carbon nanotubes grown in situ obtained in this embodiment was mixed with graphite at the ratio to obtain a 450 mAh/g composite material; the electrochemical performance of the composite material was evaluated according to the method described in embodiment 1, and the data was recorded in Table 1.

Embodiment 7

This embodiment provides a specific preparation method of a silicon-based anode material, including:

First, thoroughly mixing commercial product of modified Silicon monoxide powder with an aqueous solution of ferric chloride, and spray drying to obtain the catalyst-supported modified Silicon monoxide powder; wherein the weight fraction of ferric chloride is 0.05%; and Second, placing the catalyst-supported modified Silicon monoxide powder in a high-temperature rotary furnace, heating the catalyst-supported modified Silicon monoxide powder to 900° C. under a mixed gas (Ar:$H_2$=1:0.1), introducing acetylene gas of which volume is equivalent to that of hydrogen, holding the temperature for 4 hours, then stopping introducing acetylene gas, and cooling down to obtain the modified Silicon monoxide composite material with carbon nanotubes grown in situ.

The modified Silicon monoxide composite material with carbon nanotubes grown in situ obtained in this embodiment was mixed with graphite at the ratio to obtain a 450 mAh/g composite material; the electrochemical performance of the composite material was evaluated according to the method described in embodiment 1, and the data was recorded in Table 1.

Embodiment 8

This embodiment provides a specific preparation method of a silicon-based anode material, including:

First, thoroughly mixing commercial product of silicon-based alloy powder and an aqueous solution of ferric chloride, and spray drying to obtain the catalyst-supported silicon-based alloy powder; wherein the weight fraction of ferric chloride is 0.05%; and Second, placing the catalyst-supported silicon-based alloy powder in a high-temperature rotary furnace, heating the catalyst-supported silicon-based alloy powder to 900° C. under a mixed gas (Ar:$H_2$=1:0.1), introducing acetylene gas of which the volume is equivalent to that of hydrogen, holding the temperature for 4 hours, then stopping introducing acetylene gas, cooling down to obtain the silicon-based alloy composite material with carbon nanotubes grown in situ.

The material obtained in this embodiment was mixed with graphite at the ratio to obtain a 450 mAh/g composite material; the electrochemical performance of the composite material was evaluated according to the method described in embodiment 1, and the data was recorded in Table 1.

Comparative Example 1

This comparative example provides a specific preparation method of a silicon-based anode material compared with embodiment 1, including:

Placing the commercial product of Silicon monoxide powder in a high-temperature rotary furnace, heating the commercial product of Silicon monoxide powder to 900° C. under a mixed gas (Ar:$H_2$=1:0.1), introducing acetylene gas of which the volume is equivalent to that of hydrogen, holding the temperature for 4 hours, then stopping introducing the acetylene gas, and cooling down to obtain the Silicon monoxide composite material of this comparative example.

Figure 11:
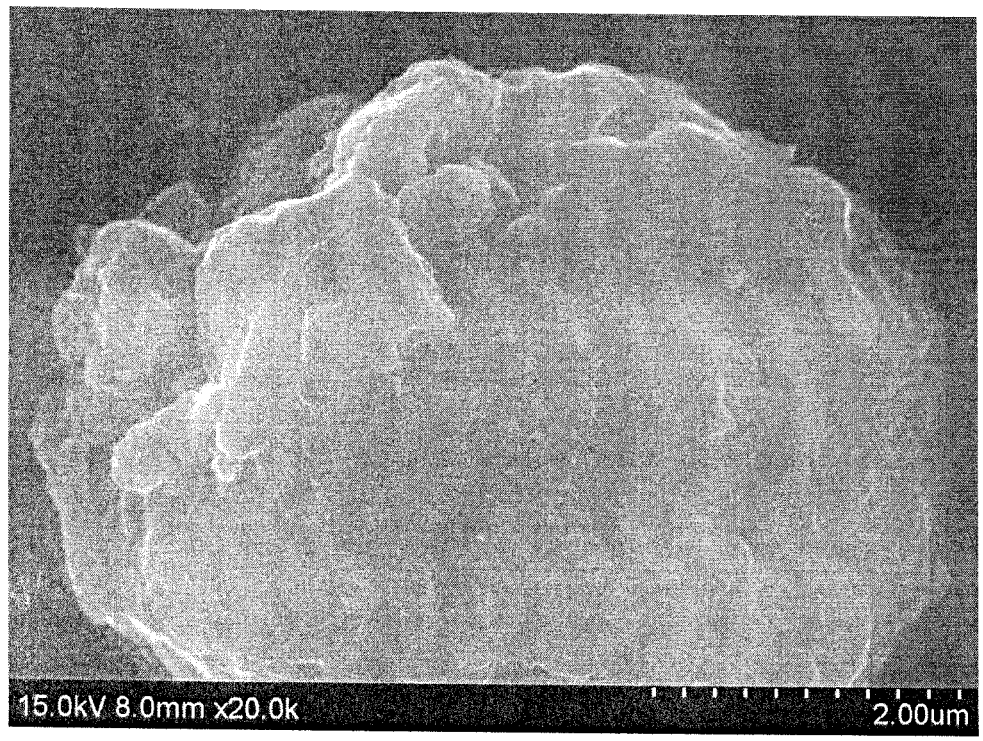
FIG. 11 is a scanning electron microscope (SEM) image of the silicon-based anode material for a lithium-ion battery obtained in Comparative Example 1.

The SEM image of the Silicon monoxide composite material obtained in this example is shown in FIG. 11, and it can be seen from that the surface of the material is coated by a continuous carbon film.

Figure 12:
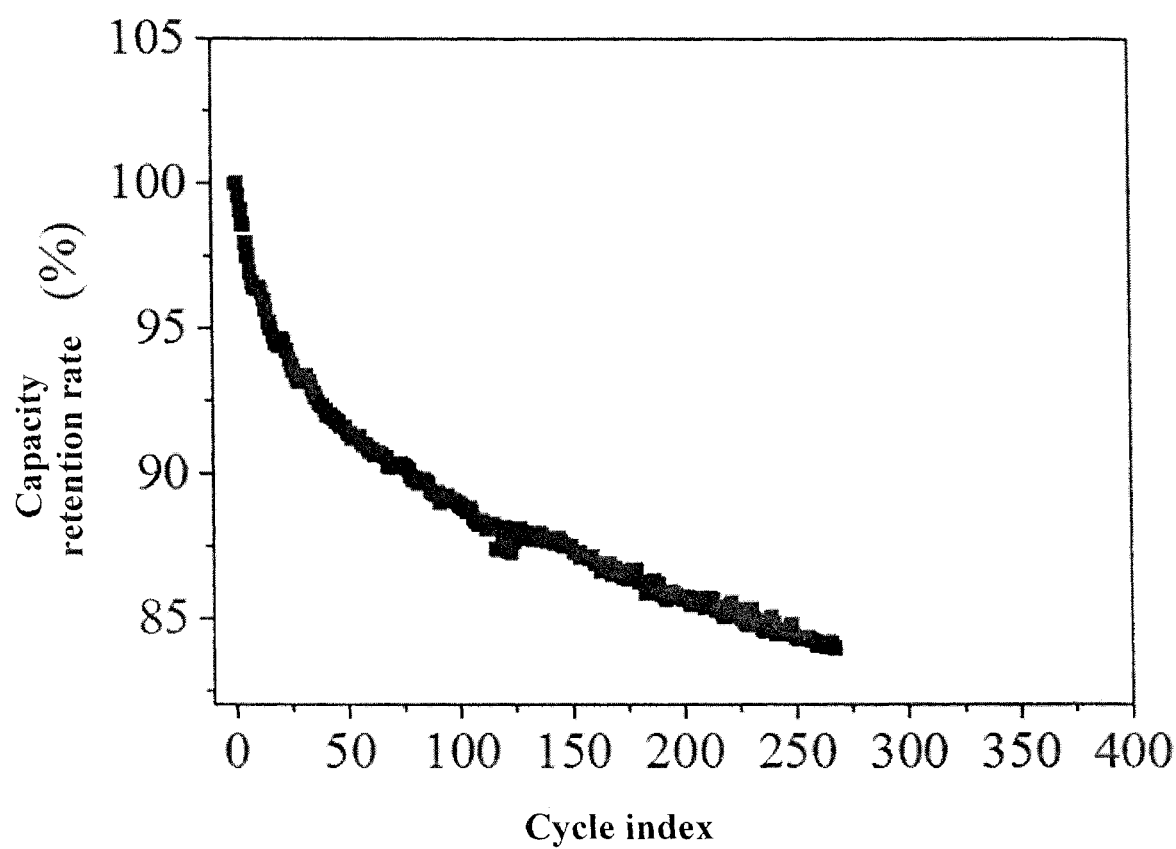
FIG. 12 is a cycle diagram of the silicon-based anode material for a lithium-ion battery obtained in Comparative Example 1.

The material obtained in this example was mixed with graphite at the ratio to obtain a 450 mAh/g composite material; the electrochemical performance of the composite material was evaluated according to the method described in embodiment 1, and the data was recorded in Table 1. The cycle performance of the material is shown in FIG. 12, and it can be seen from that the cycle performance of the material prepared in Comparative Example 1 is far lower than that obtained in embodiment 1.

Comparative Example 2

This comparative example provides a specific preparation method of a silicon-based anode material compared with embodiment 5, including:

Placing the commercial product of silicon-carbon composite material in a high-temperature rotary furnace, heating the commercial product of silicon-carbon composite material to 900° C. under a mixed gas (Ar:$H_2$=1:0.1), introducing ethanol vapor of which the volume is equivalent to that of hydrogen, holding the temperature for 2 hours, then stopping introducing ethanol vapor, and cooling down to obtain a vapor-phase coated nano silicon-carbon composite material.

The material obtained in this comparative example was mixed with graphite at the ratio to obtain a 450 mAh/g composite material; the electrochemical performance of the composite material was evaluated according to the method described in Example 1, and the data was recorded in Table 1.

It thus can be seen from that the cycle performance of the material prepared in Comparative Example 2 is far lower than that obtained in embodiment 5.

Comparative Example 3

This comparative example provides a specific preparation method of a silicon-based anode material compared with embodiment 7, including:

Placing the modified Silicon monoxide powder in a high-temperature rotary furnace, heating the modified Silicon monoxide powder to 900° C. under a mixed gas (Ar:$H_2$=1:0.1), introducing acetylene gas of which the volume is equivalent to that of hydrogen, holding the temperature for 4 hours, then stopping introducing the acetylene gas, and cooling down to obtain a vapor-phase coated modified Silicon monoxide composite material.

The material obtained in this comparative example was mixed with graphite at the ratio to obtain a 450 mAh/g composite material; the electrochemical performance of the composite material was evaluated according to the method described in embodiment 1, and the data was recorded in Table 1.

It thus can be seen from that the cycle performance of the material prepared in Comparative Example 3 is far lower than that obtained in embodiment 7.

Comparative Example 4

This comparative example provides a specific preparation method of a silicon-based anode material compared with Example 8, including:

Placing the silicon-based alloy powder in a high-temperature rotary furnace, heating the silicon-based alloy powder to 900° C. under a mixed gas (Ar:$H_2$=1:0.1), introducing acetylene gas of which the volume is equivalent to that of hydrogen, holding the temperature for 4 hours, then stopping introducing the acetylene gas, and cooling down to obtain a vapor-phase coated silicon-based alloy material.

The material obtained in this comparative example was mixed with graphite at the ratio to obtain a 450 mAh/g composite material; the electrochemical performance of the composite material was evaluated according to the method described in embodiment 1, and the data was recorded in Table 1. It thus can be seen from that the cycle performance of the material prepared in Comparative Example 4 is far lower than that obtained in embodiment 8.

TABLE 1

|  | Charge specific capacity | First-cycle efficiency | 50 cycle retention | 300 cycle retention |
| --- | --- | --- | --- | --- |
| Embodiment 1 | 455 | 88.5 | 95% | 90% |
| Embodiment 2 | 450 | 88 | 94% | 89% |
| Embodiment 3 | 457 | 88.5 | 94% | 89.5% |
| Embodiment 4 | 450 | 89 | 96% | 91% |
| Embodiment 5 | 445 | 89.5 | 95% | 85% |
| Embodiment 6 | 443 | 90 | 93% | 83% |
| Embodiment 7 | 450 | 90.5 | 98% | 90% |
| Embodiment 8 | 453 | 90 | 93% | 80% |
| Comparative Example 1 | 455 | 88.5 | 90% | 80% |
| Comparative Example 2 | 445 | 89.5 | 95% | 75% |
| Comparative Example 3 | 450 | 90.5 | 95% | 85% |
| Comparative Example 4 | 453 | 90 | 90% | 75% |

The specific embodiments described above further explain the objectives, technical solutions and beneficial effects of the present disclosure. It should be understood that the above description is only the specific embodiments of the present disclosure, and not intended to limit the scope of the present disclosure. Any modifications, equivalents, improvements and the like made without departing from the spirit and principle of the present disclosure should be included in the scope of the present disclosure.

What is claimed is:

1. A preparation method of a silicon-based anode material for a lithium-ion battery wherein the silicon-based anode material is composed of 90 wt %-99.9 wt % of a silicon-based material and 0.1 wt %-10 wt % of carbon nanotubes and/or carbon nanofibers grown in situ on a surface of the silicon-based material the silicon-based material is a powder material containing electrochemically active silicon and comprises one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material;
the carbon nanotubes comprise single-walled carbon nanotubes and/or multi-walled carbon nanotubes; the carbon nanotubes and/or carbon nanofibers have a diameter of 0.4 nm-50 nm and a length of 10 nm-50 μm;
a Raman pattern of the silicon-based anode material for the lithium-ion battery has an amorphous bulge at 475±10 cm$^{-1}$ and/or a crystalline peak at 510±10 cm$^{-1}$; in the case where the silicon-based anode material for the lithium-ion battery includes single-walled carbon nanotubes, the Raman pattern of the silicon-based anode material for the lithium-ion battery has a radial breathing mode (RBM) in the range of 100 cm$^{-1}$ to 400 cm$^{-1}$;
an X-ray diffraction (XRD) pattern of the silicon-based anode material for the lithium-ion battery has a diffraction peak at 28.4°±0.2°, comprising the steps of:
selecting a silicon-based material according to a required mass ratio, and obtain a mixed material by supporting a catalyst on a surface of the silicon-based material by a solid phase method or a liquid phase method, wherein the silicon-based material is a powder material containing electrochemically active silicon and comprises one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material; the catalyst comprises one or mixture of more of an elemental metal, an inorganic compound containing the elemental metal, and an organic compound containing the elemental metal; the elemental metal comprises one or mixture of more of Fe, Co, Ni, Cu, Zn, Al, Mg, Li, Au, Ag, Ru, and Pt; and placing the mixed material in a high-temperature reaction furnace, heating the mixed material to 600° C.-1200° C. in a protective atmosphere, introducing a carbon source gas according to a required ratio, holding temperature for 0.5-8 hours, and then stopping introducing the carbon source gas and cooling down to obtain the silicon-based anode material; wherein the carbon source gas comprises one or mixture of more of alkynes, alkenes, alkanes, ketones, alcohols, and aromatic gases.

2. The preparation method according to claim 1, wherein: the solid phase method comprises: thoroughly mixing the silicon-based material with the catalyst through a mixer, a ball mill, or a fusion machine; the liquid phase method comprises: thoroughly mixing the silicon-based material with a solution containing the catalyst and then drying; wherein the solution comprises one or mixture of more of water, alcohols, ketones, and amides.

3. The preparation method according to claim 2, wherein the mass ratio of the silicon-based material to the catalyst is between 90:10 and 99.9999:0.0001.

4. The preparation method according to claim 1, wherein the protective atmosphere is one or mixture of more of nitrogen, argon, hydrogen, helium, and neon; a volume ratio of the protective atmosphere to the carbon source gas is between 0.1:9.9 and 9.9:0.1.

5. A preparation method of a silicon-based anode material for a lithium-ion battery wherein the silicon-based anode material is composed of 90 wt %-99.9 wt % of a silicon-based material and 0.1 wt %-10 wt % of carbon nanotubes and/or carbon nanofibers grown in situ on a surface of the silicon-based material;
the carbon nanotubes comprise single-walled carbon nanotubes and/or multi-walled carbon nanotubes; the carbon nanotubes and/or carbon nanofibers have a diameter of 0.4 nm-50 nm and a length of 10 nm-50 μm;
a Raman pattern of the silicon-based anode material for the lithium-ion battery has an amorphous bulge at 475±10 cm−1 and/or a crystalline peak at 510±10 cm−1; in the case where the silicon-based anode material for the lithium-ion battery includes single-walled carbon nanotubes, the Raman pattern of the silicon-based anode material for the lithium-ion battery has a radial breathing mode (RBM) in the range of 100 cm−1 to 400 cm−1;
an X-ray diffraction (XRD) pattern of the silicon-based anode material for the lithium-ion battery has a diffraction peak at 28.4°±0.2°;
the single-walled carbon nanotubes have a diameter of 0.4 nm-10 nm and a length of 10 nm-20 μm;
the multi-walled carbon nanotubes have a diameter of 0.4 nm-50 nm and a length of 10 nm-20 μm; and
the carbon nanofibers have a diameter of 0.4 nm-50 nm and a length of 10 nm-20 μm, comprising the steps of:

selecting a silicon-based material according to a required mass ratio, and obtain a mixed material by supporting a catalyst on a surface of the silicon-based material by a solid phase method or a liquid phase method, wherein the silicon-based material is a powder material containing electrochemically active silicon and comprises one or mixture of more of a nano silicon-carbon composite material, a Silicon monoxide material, a modified Silicon monoxide material, and an amorphous silicon alloy; the electrochemically active silicon accounts for 0.1 wt %-90 wt % of the silicon-based material; the catalyst comprises one or mixture of more of an elemental metal, an inorganic compound containing the elemental metal, and an organic compound containing the elemental metal; the elemental metal comprises one or mixture of more of Fe, Co, Ni, Cu, Zn, Al, Mg, Li, Au, Ag, Ru, and Pt; and placing the mixed material in a high-temperature reaction furnace, heating the mixed material to 600° C.-1200° C. in a protective atmosphere, introducing a carbon source gas according to a required ratio, holding temperature for 0.5-8 hours, and then stopping introducing the carbon source gas and cooling down to obtain the silicon-based anode material; wherein the carbon source gas comprises one or mixture of more of alkynes, alkenes, alkanes, ketones, alcohols, and aromatic gases.

\* \* \* \* \*